(12) United States Patent
Groezinger et al.

(10) Patent No.: US 9,677,511 B2
(45) Date of Patent: Jun. 13, 2017

(54) EXHAUST GAS COOLER

(75) Inventors: Steffen Groezinger, Vaihingen (DE);
Martin Paarmann, Stuttgart (DE);
Henning Schroeder, Stuttgart (DE)

(73) Assignee: Mahle International GmbH (DE)

( * ) Notice: Subject to any disclaimer, the term of this patent is extended or adjusted under 35 U.S.C. 154(b) by 796 days.

(21) Appl. No.: 14/001,122

(22) PCT Filed: Feb. 20, 2012

(86) PCT No.: PCT/EP2012/052864
§ 371 (c)(1),
(2), (4) Date: Dec. 30, 2013

(87) PCT Pub. No.: WO2012/113753
PCT Pub. Date: Aug. 30, 2012

(65) Prior Publication Data
US 2014/0123965 A1    May 8, 2014

(30) Foreign Application Priority Data

Feb. 23, 2011    (DE) .................... 10 2011 004 606

(51) Int. Cl.
*F01N 3/00* (2006.01)
*F01N 3/02* (2006.01)
(Continued)

(52) U.S. Cl.
CPC ....... *F02M 25/0726* (2013.01); *F01N 3/0205* (2013.01); *F02M 26/22* (2016.02);
(Continued)

(58) Field of Classification Search
CPC .............. F01N 2240/02; F01N 3/0205; F02M 25/0726; F28D 7/1623; F28D 7/163;
(Continued)

(56) References Cited

U.S. PATENT DOCUMENTS 4,739,826 A    4/1988 Michelfelder et al.
4,924,938 A    5/1990 Plaschkes
(Continued)

FOREIGN PATENT DOCUMENTS

DE         3737433 A1    5/1988
DE    102007049184 A1    4/2009
(Continued)

OTHER PUBLICATIONS

English abstract provided for JP-2006-57473.
English abstract provided for EP-0285504.

*Primary Examiner* — Thai Ba Trieu
*Assistant Examiner* — Diem Tran
(74) *Attorney, Agent, or Firm* — Fishman Stewart PLLC

(57) ABSTRACT

An exhaust gas cooler may include an outer housing and an inner housing having a heat exchanger insert arranged therein. The heat exchanger insert may include a plurality of pipes around which exhaust gas flows transversely in the inner housing and through at least some of which a coolant of a first cooling circuit flows. At least a portion of the outer housing may be cooled by a second cooling circuit. The second cooling circuit may be separate from the first cooling circuit.

20 Claims, 3 Drawing Sheets

(51) Int. Cl.
*F02M 25/07* (2006.01)
*F28D 7/16* (2006.01)
*F28F 1/32* (2006.01)
*F28F 9/00* (2006.01)
*F02M 26/22* (2016.01)

(52) U.S. Cl.
CPC ........... *F28D 7/163* (2013.01); *F28D 7/1623* (2013.01); *F28F 1/32* (2013.01); *F28F 9/001* (2013.01); *F01N 2240/02* (2013.01); *Y02T 10/20* (2013.01)

(58) Field of Classification Search
CPC ...... F28D 1/05325; F28D 7/0075; F28F 1/32; F28F 9/001; F28F 2250/106; Y02T 10/20
USPC .................................................. 60/298, 320
See application file for complete search history.

(56) References Cited

U.S. PATENT DOCUMENTS

| | | | |
|---|---|---|---|
| 6,628,554 | B2 | 9/2003 | Hidaka |
| 8,881,513 | B2* | 11/2014 | Bruck ................... F01N 3/2053 60/298 |
| 2009/0038302 | A1* | 2/2009 | Yamada ................ F01N 3/0205 60/320 |
| 2011/0185714 | A1* | 8/2011 | Lohbreyer ............ F28D 7/1623 60/320 |

FOREIGN PATENT DOCUMENTS

| | | |
|---|---|---|
| DE | 102008011557 A1 | 6/2009 |
| DE | 102008011558 A1 | 6/2009 |
| EP | 0285504 A1 | 10/1988 |
| FR | 2552857 A1 | 4/1985 |
| JP | 2002-074990 A | 3/2002 |
| JP | 2006-057473 A | 3/2006 |

* cited by examiner

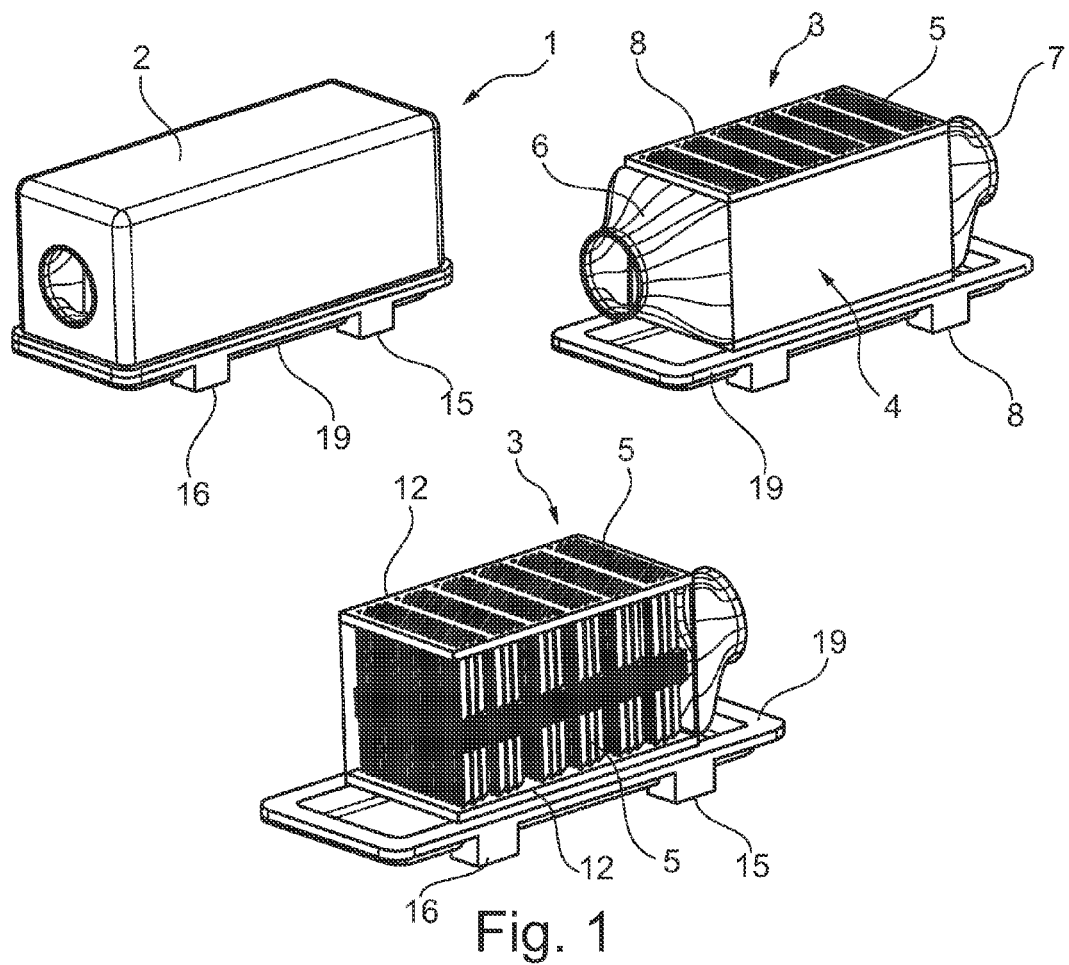
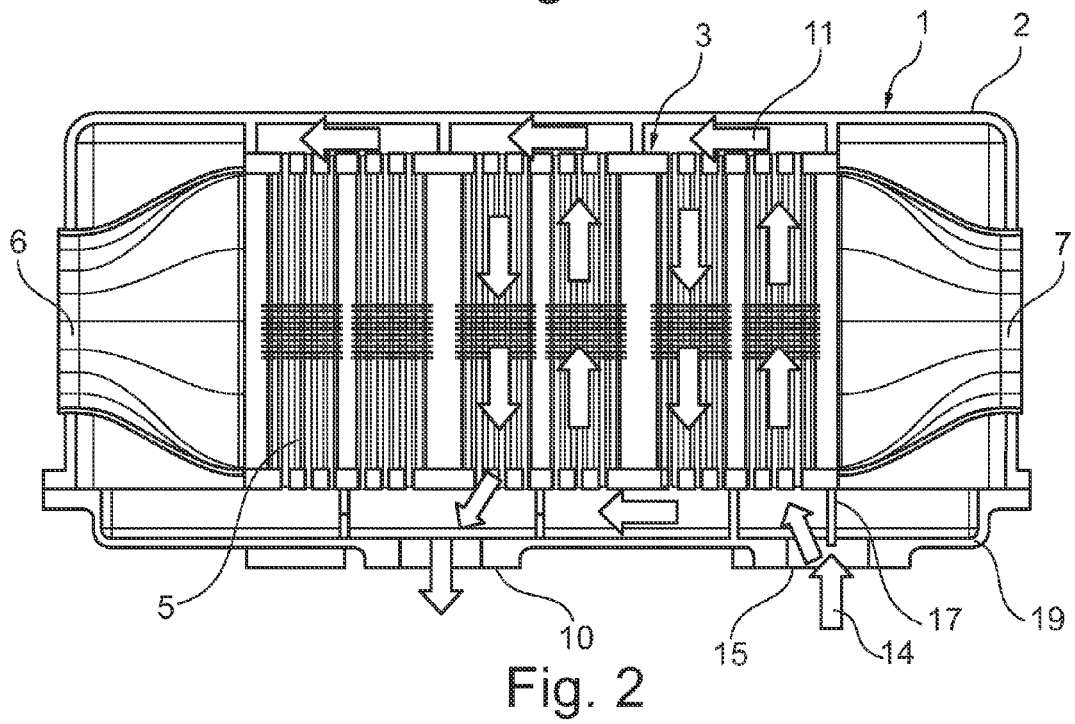
Fig. 1
Fig. 2

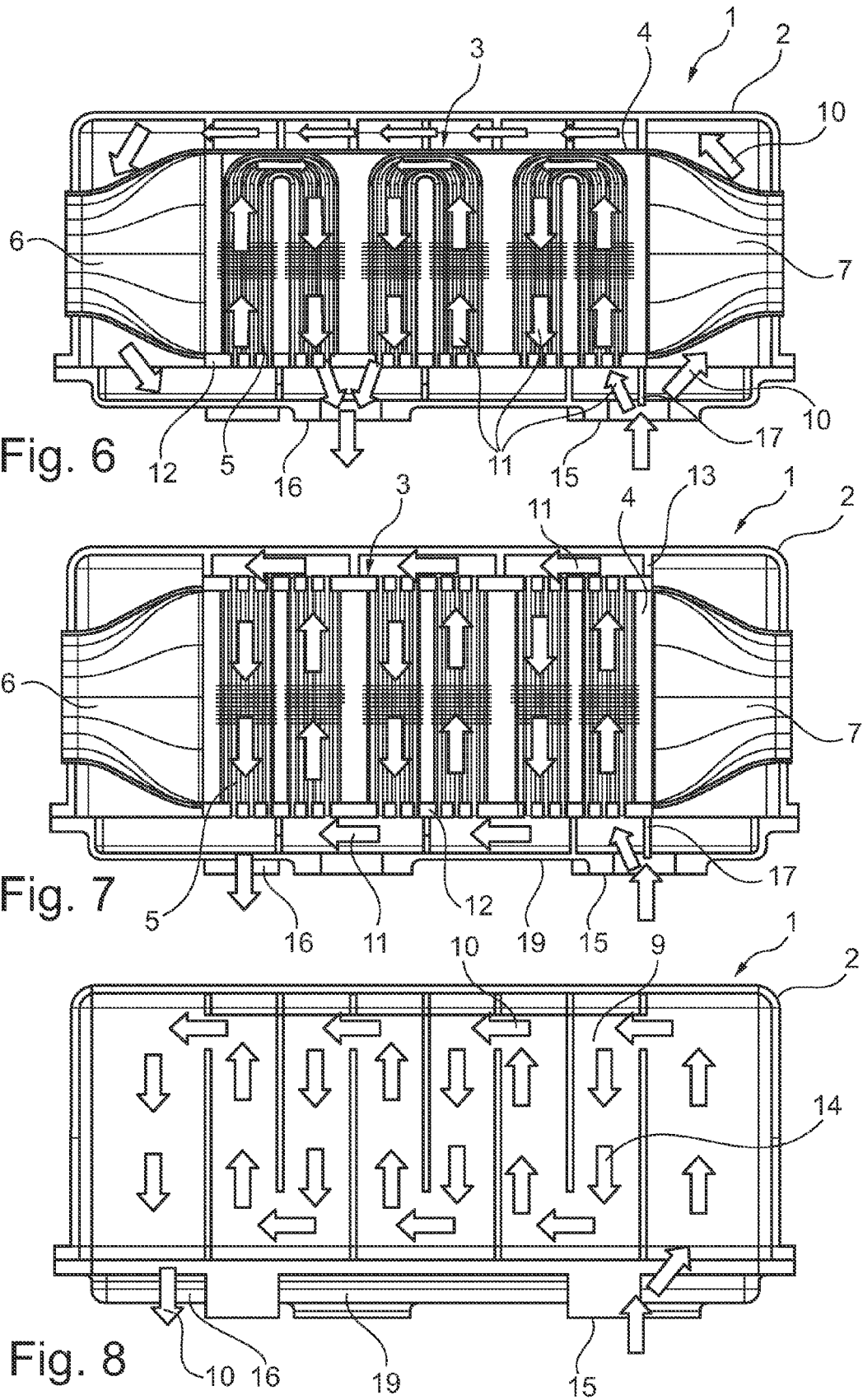

EXHAUST GAS COOLER

CROSS-REFERENCE TO RELATED APPLICATIONS

This application claims priority to German Patent Application 10 2011 004 606.2 filed Feb. 23, 2011, and International Patent Application PCT/EP2012/052864 filed on Feb. 20, 2012, both of which are hereby incorporated by reference in their entirety.

TECHNICAL FIELD

The present invention relates to an exhaust gas cooler, having an outer housing and a heat exchanger insert arranged therein, according to the preamble of Claim 1.

BACKGROUND

DE 10 2008 011 557 A1 discloses a generic exhaust gas cooler having a heat exchanger insert and a plurality of heat exchanger sets integrated between an inflow region and an outflow region of the exhaust gas. These heat exchanger sets comprise cooling pipes having cooling ribs, the heat exchanger insert being surrounded by an inner housing, the side walls of which are arranged at a distance from the perforated side walls of the heat exchanger insert. Oblique guide ducts for transferring the coolant from a coolant inlet via the individual heat exchanger sets to the coolant outlet are provided between the closed side walls of the heat exchanger insert and the adjacent side walls of the housing. The known exhaust gas cooler is intended to prevent in particular excessive heating of the housing.

DE 10 2008 011 558 A1 discloses a heat exchanger in a housing having a plurality of heat exchanger sets integrated between an inflow region and an outflow region of an exhaust gas. These heat exchanger sets comprise guides having cooling ribs and have trough-like, stamped turbulators out of the planes of the cooling ribs on the circumference of the cooling pipes. This is intended to allow particularly effective heat exchange.

In exhaust gas coolers of the known type, extremely high thermal loads often occur, as a result of which the service life, in particular of an outer housing, is limited.

SUMMARY

The present invention is therefore concerned with the problem of specifying an improved or at least an alternative embodiment for an exhaust gas cooler of the generic type, which can in particular be temperature-adjusted in a more individualised manner.

This problem is solved according to the invention by the subject matter of the independent claims. Advantageous embodiments form the subject matter of the dependent claims.

The present invention is based on the general concept of, rather than leaving an outer housing of an exhaust gas cooler uncooled as before, actively cooling it by means of a separate, second cooling circuit and thereby reducing the temperature gradients and the associated thermal stresses that occur there. The exhaust gas cooler according to the invention has an outer housing and a heat exchanger insert arranged therein, which has pipes around which exhaust gas flows transversely in an inner housing and through which a coolant of a first cooling circuit flows. It is essential to the invention that the outer housing is cooled by the second cooling circuit, which is separate from the first cooling circuit. The second cooling circuit generally serves to cool the outer housing and therefore to reduce the thermal stresses occurring there. With the exhaust gas cooler according to the invention, the service life can therefore be considerably increased, as the material loads caused by the thermal stresses are much lower. In spite of this, the exhaust gas cooler according to the invention has a high power density and a compact shape, as a result of which it can be installed in modern engine compartments, which are often quite constricted. The separate second cooling circuit for cooling the outer housing means that the temperature of the exhaust gas cooler can also be used better and in particular more flexibly both in the region of the heat exchanger insert and in the region of the outer housing. The closed inner housing and the outer housing can together form ducts for the second cooling circuit and/or the outer housing can be double-walled at least in some regions, and thereby provide such ducts for the second cooling circuit.

In an advantageous development of the solution according to the invention, the first and the second cooling circuit are parallel-connected. In the case of a parallel connection, it is in particular possible to form the first and second cooling circuits as separate cooling circuits and thereby in particular adjust the temperature differently. The coolant flow can in this case be already divided in a coolant inlet, one part flowing through the pipes and the other part flowing along the outer housing. It is however also conceivable for the coolant flow to be divided at the coolant inlet, one part flowing through a certain number of pipes of the heat exchanger insert and the other part flowing along the outer housing and then through the rest of the pipes. It is likewise conceivable for the coolant flow to be divided at the coolant inlet and then one part to flow through a certain number of pipes and the other part to flow through the remaining number of pipes and then along the outer housing. Even this list demonstrates how diversely and therefore flexibly the flow direction of the two coolant circuits can be defined in the exhaust gas cooler according to the invention. The two separate coolant circuits therefore not only allow the outer housing to be temperature-adjusted differently from the pipes of the heat exchanger insert, but it is also possible to adjust the temperature of different regions of the heat exchanger insert differently.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures,

FIG. 1 schematically shows an exhaust gas cooler according to the invention once with the outer housing mounted, once without a mounted outer housing and once without a mounted inner housing, FIG. 2 schematically shows a possible flow route of a first cooling circuit, FIG. 3 schematically shows a diagram similar to FIG. 2, but with the flow profile of the second circuit.

DETAILED DESCRIPTION

Figure 3:
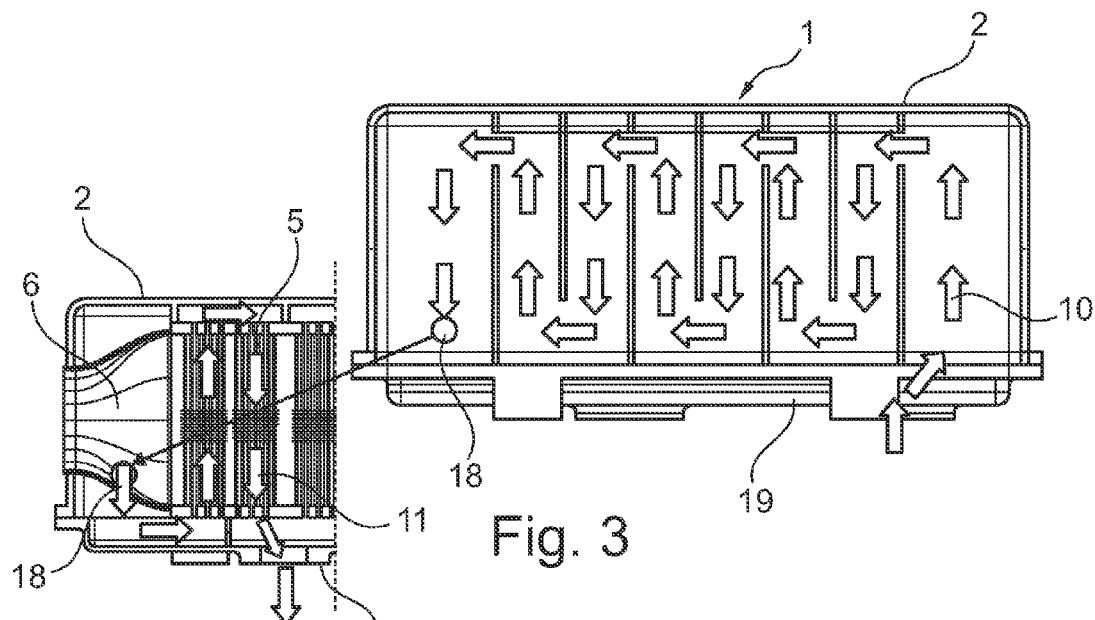
Figure 4:
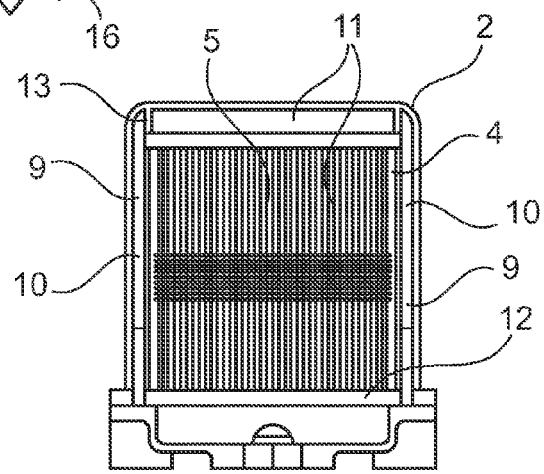
FIG. 4 shows a cross-sectional diagram through the exhaust gas cooler according to the invention, FIG. 5 schematically shows a diagram as in FIG. 2, but with both cooling circuits, FIG. 6 schematically shows a diagram as in FIG. 5, but with a further possible flow route of the first and second cooling circuits, FIG. 7 schematically shows a possible flow route of the first cooling circuit, FIG. 8 schematically shows a possible flow route of the second cooling circuit.

According to FIGS. 1 to 8, an exhaust gas cooler 1 according to the invention has an outer housing 2 having a heat exchanger insert 3 arranged therein. The heat exchanger insert 3 has pipes 5 around which exhaust gas flows transversely in an inner housing 4 and through which a coolant of a first cooling circuit 11 flows. The inner housing 4 usually has inlet and outlet diffusors 6, 7 and two side walls 8. To reduce a thermal load in particular for the outer housing 2 and at the same time make it possible to realise flexible and individualised cooling, the solution according to the invention proposes for at least regions of the outer housing 2, in particular side walls 8, to be cooled by a second cooling circuit 10, which is separate from the first cooling circuit 11. The inner housing 4 and the outer housing 2 can together form ducts 9 for the second cooling circuit 10 or the outer housing 2 is double-walled at least in some regions (cf. FIG. 4) and thereby forms ducts 9 for the second cooling circuit 10. Exhaust gas flows through the exhaust gas cooler 1 in the longitudinal direction. The pipes 5 themselves are each held at the longitudinal end sides by means of two pipe ends 12. It is of course also conceivable for the pipes 5 to be U-shaped rather than straight, as is shown for example in FIG. 6, so in this case only a single pipe end 12 is needed to hold the pipes 5. The active cooling of the outer housing 2 reduces temperature gradients occurring therein and therefore also decreases the thermal load for the outer housing 2. The separate configuration of the two cooling circuits 11, 10 means that individual temperature adjustment possibilities can be created, which would not be possible with conventional exhaust gas coolers.

Webs/ribs 13, which each form a duct wall of the ducts 9 for the second cooling circuit 10, can be arranged on the outside of the inner housing 4 and/or on the inside of the outer housing 2. In general, the first cooling circuit 11 and the second cooling circuit 12 can be connected parallel to each other, as is shown for example according to FIG. 6.

It can be seen in FIG. 2 that a coolant flow 14 starting from the coolant inlet 15 flows first in a meandering manner via some of the pipes 5 as far as the coolant outlet 16. A divider 17, which divides the coolant flow 14 into the first and second cooling circuits 11, 10, is arranged in the region of the coolant inlet 15. FIG. 2 shows the first cooling circuit 11, whereas FIG. 3 shows the second cooling circuit 10, which first cools the outer housing 2 and then flows through some of the pipes 5 to the coolant outlet. FIGS. 2 and 3 therefore belong together, wherein the coolant flow 14, which is first diverted by the divider 17 into the second cooling circuit 10, first flows through the ducts 9 in the second cooling circuit 10 and only then is directed through a corresponding opening 18 in the region of the inlet diffusor 6 and then through a cover 19 through the pipes 5 to the coolant outlet 16.

Figure 5:
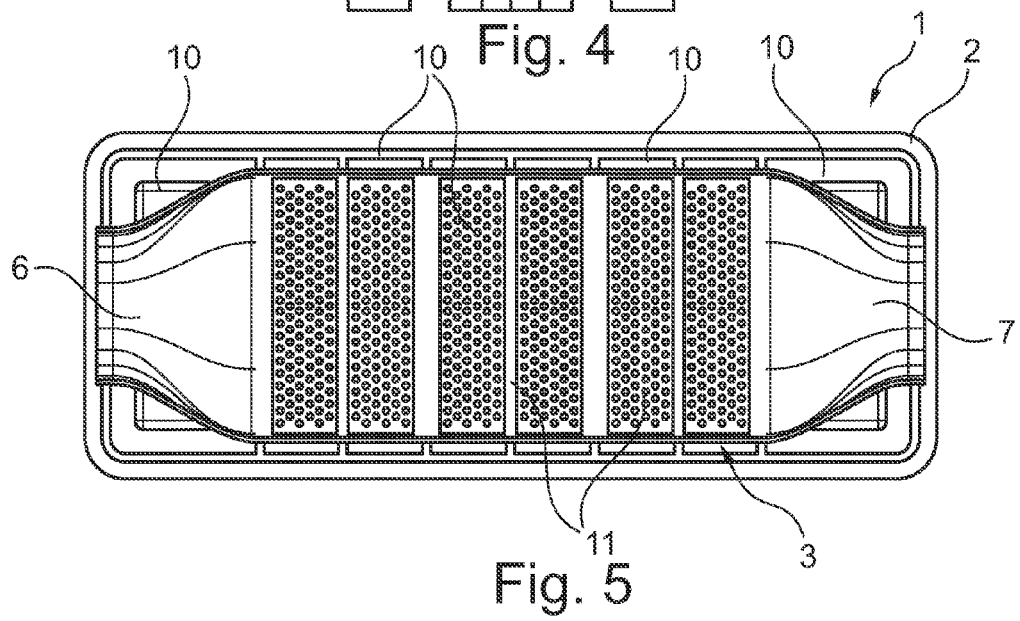

It can be seen in FIG. 5 that the first cooling circuit 11 flows through two heat exchanger sets, and the second cooling circuit 10 flows through the outer housing 2 and the third heat exchanger set.

In FIG. 6, a diversion of the coolant flow 14 is effected in the region of the first cooling circuit 11 by means of U-shaped pipes 5. In this case the first and second coolant flows 10, 11 run parallel to each other. FIG. 7 shows a further flow path of the first cooling circuit 11, FIG. 8 showing the flow path of the second cooling circuit 10, which serves to cool the outer housing 2.

The active cooling of the outer housing 2 according to the invention allows in particular the temperature gradients and therefore also the thermal loads on the outer housing 2 to be reduced, as a result of which the thermal load overall can be reduced and the service life increased. The outer housing 2 can be cooled either by ducts 9, which are formed by both the inner housing 4 and the outer housing 2, for example by means of ribs/webs 13, and/or by a double-walled configuration of the outer housing 2, as is shown for example in FIG. 4.

The separately formed cooling circuits 11, 10 allow individualised cooling to be achieved, which is particularly flexible if the two cooling circuits 11, 10 are completely separate from each other and not just divided at the coolant inlet by means of the divider 17. If the two cooling circuits 11, 10 are completely separated, they could have completely different temperatures and thereby effect individualised cooling of different regions of the exhaust gas cooler 1. For example, the temperature of the coolant in the first cooling circuit 11 could be lower than in the second cooling circuit 10, as a result of which uniform temperature adjustment of the exhaust gas cooler 1 could be achieved owing to the hot exhaust gases.

The invention claimed is:

1. An exhaust gas cooler, comprising: an outer housing and an inner housing having a heat exchanger insert arranged therein, the heat exchanger insert including a plurality of pipes around which exhaust gas flows transversely in the inner housing and through at least some of which a coolant of a first cooling circuit flows, wherein at least a portion of the outer housing is cooled by a second cooling circuit, the second cooling circuit being separate from the first cooling circuit.

2. The exhaust gas cooler according to claim 1, wherein the inner housing and the outer housing together form ducts for the second cooling circuit.

3. The exhaust gas cooler according to claim 1, further comprising webs arranged on at least one of an outside of the inner housing and on an inside of the outer housing, the webs configured to form a wall for the ducts.

4. The exhaust gas cooler according to claim 1, wherein the first and second cooling circuits extend parallel to each other.

5. The exhaust gas cooler according to claim 1, wherein the exhaust gas cooler defines a coolant inlet and a coolant outlet, and further comprising a divider arranged in a region of the coolant inlet and configured to direct an inflowing coolant flow into the first and second cooling circuits.

6. The exhaust gas cooler according to claim 1, wherein the pipes are straight and connected to each other by pipe ends.

7. The exhaust gas cooler according to claim 1, wherein the pipes are U-shaped and connected to each other by a pipe end.

8. The exhaust gas cooler according to claim 6, wherein at least one pipe end forms a part of the inner housing.

9. The exhaust gas cooler according to claim 1, wherein at least a portion of the outer housing is double-walled and configured to form ducts for the second cooling circuit.

10. The exhaust gas cooler according to claim 9, further comprising webs arranged on at least one of an outside of the inner housing and on an inside of the outer housing, the webs configured to form a wall for the ducts.

11. The exhaust gas cooler according to claim 1, wherein the second cooling circuit is between the inner housing and the outer housing.

12. An internal combustion engine having an exhaust gas cooler, comprising:
an outer housing and an inner housing having a heat exchanger insert arranged therein, the heat exchanger insert including a plurality of pipes around which exhaust gas flows transversely in the inner housing and through at least some of which a coolant of a first cooling circuit flows, wherein at least a portion of the outer housing is cooled by a second cooling circuit, the second cooling circuit being separate from the first cooling circuit.

13. The internal combustion engine of claim 12, wherein the inner housing and the outer housing together form ducts for the second cooling circuit.

14. The internal combustion engine of claim 12, wherein at least a portion of the outer housing is double-walled and configured to form ducts for the second cooling circuit.

15. The internal combustion engine of claim 12, further comprising webs arranged on at least one of an outside of the inner housing and on an inside of the outer housing, the webs configured to form a wall for the ducts.

16. The internal combustion engine of claim 12, wherein the first and second cooling circuits extend parallel to each other.

17. The internal combustion engine of claim 12, wherein the exhaust gas cooler defines a coolant inlet and a coolant outlet, and further comprising a divider arranged in a region of the coolant inlet and configured to direct an inflowing coolant flow into the first and second cooling circuits.

18. The internal combustion engine of claim 12, wherein the pipes are straight and connected to each other by pipe ends.

19. The internal combustion engine of claim 12, wherein the pipes are U-shaped and connected to each other by a pipe end.

20. The internal combustion engine of claim 12, wherein at least one pipe end forms a part of the inner housing.

* * * * *